(12) United States Patent
Murphy et al.

(10) Patent No.: US 10,343,818 B2
(45) Date of Patent: Jul. 9, 2019

(54) CONTAINER FOR AN AEROSOL GENERATING DEVICE

(71) Applicant: JT International S.A., Geneva (CH)

(72) Inventors: Chris Murphy, Dublin (IE); Kevin Maguire, Dublin (IE); James Carroll, Dublin (IE); Andrew Rogan, Moray (GB); Kyle Adair, Lisburn (IE)

(73) Assignee: JT International S.A. (CH)

( * ) Notice: Subject to any disclaimer, the term of this patent is extended or adjusted under 35 U.S.C. 154(b) by 0 days.

(21) Appl. No.: 15/526,599

(22) PCT Filed: Nov. 5, 2015

(86) PCT No.: PCT/EP2015/075843
§ 371 (c)(1),
(2) Date: May 12, 2017

(87) PCT Pub. No.: WO2016/075028
PCT Pub. Date: May 19, 2016

(65) Prior Publication Data
US 2017/0334605 A1  Nov. 23, 2017

(30) Foreign Application Priority Data

Nov. 14, 2014 (EP) .................................... 14193307

(51) Int. Cl.
| | |
|---|---|
| *A24F 13/00* | (2006.01) |
| *A24F 17/00* | (2006.01) |
| *A24F 25/00* | (2006.01) |
| *B65D 25/20* | (2006.01) |
| *A24F 15/18* | (2006.01) |
| *A24F 47/00* | (2006.01) |
| *A24F 9/16* | (2006.01) |
| *B65D 25/04* | (2006.01) |
| *B65D 43/16* | (2006.01) |

(Continued)

(52) U.S. Cl.
CPC ............... *B65D 25/20* (2013.01); *A24F 9/16* (2013.01); *A24F 15/18* (2013.01); *A24F 47/008* (2013.01); *B65D 25/04* (2013.01); *B65D 43/16* (2013.01); *B65D 85/20* (2013.01); *H02J 7/0042* (2013.01)

(58) Field of Classification Search
CPC ....... B65D 25/20; B65D 43/61; A24F 47/008; A24F 47/002; A24F 15/00
USPC .................................................. 131/329, 328
See application file for complete search history.

(56) References Cited

U.S. PATENT DOCUMENTS 5,848,596 A * 12/1998 Zelenik .................. A24F 23/04
131/329
6,446,793 B1 * 9/2002 Layshock ............... A24F 15/18
206/85

(Continued)

OTHER PUBLICATIONS

International Search Report for Application No. PCT/EP2015/075843 dated Feb. 3, 2016.

*Primary Examiner* — Hae Moon Hyeon
(74) *Attorney, Agent, or Firm* — Lerner, David, Littenberg, Krumholz & Mentlik, LLP (57) ABSTRACT

A container for an aerosol generating device is disclosed. The container has a body having a first portion configured to receive an aerosol generating device, one or more recesses forming a cut-out of a corner of the body, and one or more retention means externally accessible from the body, each retention means being configured to releasably retain a module.

15 Claims, 7 Drawing Sheets

(51) Int. Cl.
*B65D 85/20* (2006.01)
*H02J 7/00* (2006.01)

(56) References Cited

U.S. PATENT DOCUMENTS

| | | | |
|---|---|---|---|
| 9,089,166 B1* | 7/2015 | Scatterday | A24F 15/12 |
| 9,775,380 B2* | 10/2017 | Fernando | A24F 47/008 |
| 9,833,021 B2* | 12/2017 | Perez | A24F 47/008 |
| 2009/0283103 A1 | 11/2009 | Nielsen et al. | |
| 2010/0313901 A1* | 12/2010 | Fernando | A24F 47/008 |
| | | | 131/330 |
| 2012/0227753 A1* | 9/2012 | Newton | A24F 47/008 |
| | | | 131/347 |
| 2014/0053858 A1 | 2/2014 | Liu | |
| 2014/0097103 A1* | 4/2014 | Cameron | A24F 47/008 |
| | | | 206/38 |
| 2014/0107815 A1 | 4/2014 | LaMothe | |
| 2015/0114411 A1* | 4/2015 | Buchberger | A61M 11/041 |
| | | | 131/329 |
| 2015/0333561 A1* | 11/2015 | Alarcon | H02J 7/0042 |
| | | | 131/329 |

* cited by examiner

CONTAINER FOR AN AEROSOL GENERATING DEVICE

CROSS-REFERENCE TO RELATED APPLICATIONS

The present application is a national phase entry under 35 U.S.C. § 371 of International Application No. PCT/EP2015/075843, filed Nov. 5, 2015, published in English, which claims priority from EP 14193307.7, filed Nov. 14, 2014, the disclosures of which are incorporated herein by reference.

BACKGROUND

The present invention relates to a container for holding an aerosol generating device such as an electronic cigarette and one or more modules connectable to the container giving complementary or additional functionality to a user.

Aerosol generating devices such as electronic cigarettes are relatively well known in the art. In use, a liquid stored in the aerosol generating device is heated to form an aerosol, which is then conveyed to a user. Aerosol generating devices typically involve a permanent part (such as the body of the device) and a replaceable part (such as the cartridge holding the liquid).

While not in use, a user may store the aerosol generating device in a container. Such a container is typically in the form of a box. In some cases, inside the box there is room for one or more of the replaceable parts. These replaceable parts are often simply inserted into the empty space left around the aerosol generating device. This means that the replaceable parts, even if they can be included, are susceptible to damage.

Conventional cigarette containers typically have twenty cigarettes, which provide users with enough material to last a full day. In comparison, with electronic cigarettes, a user may need multiple replaceable parts (such as cartridges) over a single day and may need to recharge the electronic cigarette. This would therefore typically require a user to carry spare replaceable parts and a battery charger, which is bulky and inconvenient.

Accordingly, it remains a problem that there is no convenient and reliable means through which a user can store the permanent part of the aerosol generating device with one or more replaceable parts in order to allow sustained usage of the aerosol generating device over a reasonable period of time, and to provide the aerosol generating device with additional functionality. The present invention therefore seeks to provide a container for an aerosol generating device which overcomes at least some of the above problems.

SUMMARY OF INVENTION

According to a first aspect, there is provided a container for an aerosol generating device. The container has a body comprising a first portion configured to receive an aerosol generating device and one or more retention means externally accessible from the body. Each retention means is configured to releasably retain a module.

In this manner, the aerosol generating device (such as an electronic cigarette) can be conveniently located in a first portion of the container. Since the first portion of the container is configured for receiving the aerosol generating device, this ensures that the aerosol generating device is securely and safely stored. In addition, one or more modules can be releasably retained on the body for storing the articles.

The externally accessible retention means ensures that the modules are easily attachable without any need for disassembly of the container. This in turn reduces the risk of portions of the container being damaged during disassembly and reassembly when modules are changed, allowing for ease of use, a more robust container, and a simplified manufacture.

Additionally, since the module is not integrally formed with the body, a variety of modules may be interchangeably used with a single body. This enhances usability and adaptability, by allowing the user to add or remove functionality. For example without being limitative, the module may comprise one or more of: one or more replaceable parts for the aerosol generating device, a battery, and a charging device.

Preferably, the container further comprises one or more readers configured to receive data from a module. Based on this data, a processor of the container may be configured to perform one or more procedures based on the received data. This allows for a "smart container" which constantly monitors various conditions, and allows for the user to more accurate gauge the state of the various devices without themselves inspecting them.

The processor may be configured to monitor state data, comprising the state of one or more of: the container, the aerosol generating device, the module and articles stored within the module. The processor may also be configured to send a message to a recipient based on the state data and/or the received data. For example, the message may be a request send to a mobile device associated with the user that a particular kind of module should be inserted, or may be an alert that the wrong kind of module has been inserted. This further improves the functionality of the container and provides a significantly safer and more robust user experience.

Preferably, the body further comprises one or more recesses, each retention means being located in a respective recess. Each retention means is selected from the group consisting of: a slide mechanism; a clip mechanism; and a magnet. Since the retention means are located in a recess, this reduces the risk that the retention means becomes damaged when a module is not inserted, and also provides a clear visual guide to the user as to where the module should be installed. Preferably, the container comprises a cap configured to cover an end of the body, which may be hingedly connected to the body. This allows the contents of the container to be further protected, and can prevent them from falling out of the container when the container is inverted.

Preferably the body further comprises a second portion configured to receive one or more articles. Where the aerosol generating device comprises at least a permanent part and a replaceable part; the one or more articles may comprise at least one additional replaceable part. This enhances the functionality of the container, by providing for articles associated with the aerosol generating device to be safely and conveniently stored alongside it in a single package.

In one configuration, the first portion comprises a first chamber in the body having a first length and a first width; and the second portion comprises a second chamber in the body having a second length and a second width; where the first length and the second length are not equal. The first chamber can be substantially parallel to the second chamber. A first recess can be located below the second portion, such that the body has a substantially L-shape, the recess having a third length and a third width, wherein the third width is substantially equal to the second width, and the third length is substantially equal to the difference between the first length and the second length.

The differences in sizes typically reflects that articles for use with the aerosol generating device (which can sit in the second portion) will generally be smaller than the aerosol generating device itself (which can sit in the first portion). This also conveniently provides for a location for a module to be connected, which results in a substantially cuboid container which has no sharp corners which can catch on other items. This provides for a safer and more robust storage solution.

In another configuration, the first portion comprises a first chamber in the body having a first length and a first width; and the second portion comprises: a second chamber in the body having a second length and a second width; and a third chamber in the body having a third length and a third width. The second chamber can be located on a first side of the first chamber and the third chamber can be located on a second side of the first chamber opposite to the first side, such that the body has a substantially T-shape. A first recess can be located below the second chamber, the first recess having a fourth length and a fourth width; and a second recess can be located below the third chamber, the second recess having a fifth length and a fifth width; wherein the fourth width is substantially equal to the second width, and the fourth length is substantially equal to the difference between the first length and the second length; and the fifth width is substantially equal to the third width, and the fifth length is substantially equal to the difference.

This configuration allows for two separate modules to be simultaneously connected, thereby further enhancing the configurability of the container.

According to a second aspect, there is also provided a module configured to be releasably retained by a retention means of the container of the first aspect.

BRIEF DESCRIPTION OF FIGURES

Examples of the present invention will now be described with reference to the accompanying drawings, in which:

FIG. 1 shows a view of the container of the present invention in a first embodiment together with an example aerosol generating device and articles;

FIG. 2 shows a further view of the container of the first embodiment with an example module installed;

FIG. 3 shows a further view of the container of the first embodiment with an example module installed and with an example aerosol generating device and articles inserted;

FIG. 4 shows a sectional view of the container of the first embodiment with an example module installed and with example articles inserted;

FIG. 5 shows a view of the container of the present invention in a second embodiment having a T-shape configuration;

FIG. 6 shows a view of the container of the present invention in a third embodiment having an I-shape configuration;

FIGS. 7A to 7C show examples of modules which can be used with containers of the present invention.

DETAILED DESCRIPTION

The container 10 comprises an integrally-formed body 12 having a first portion 14 configured to receive an aerosol generating device 30 (such as an electronic cigarette). The body 12 can be formed of one or more of metal, plastic (such as polyethylene terephthalate), ceramic, paper (such as reinforced paper or carton paper), or any other suitable material or combination of materials. The body may comprise additionally comprise alignment means (not shown) on its outer surface for aligning the container 10 with another device.

The first portion 14 takes the form of a chamber in the body. The chamber has an open end into which the aerosol generating device can be inserted, and a closed end against which the aerosol generating device can rest. The chamber is sized and shaped such that an aerosol generating device 30 may sit within the chamber. For example, the chamber may have a circular cross-section, to match the cylindrical shape of the aerosol generating device 30. Other cross-sectional shapes, such as oval, rectangular, triangular or the like are also envisaged.

The body 12 further comprises one or more retention means 16. Each retention means 16 is configured such that it is externally accessible from the body. In general, this means that prior to a module 40 being connected to the container 10, the retention means 16 is visible and accessible without any disassembly of parts of the container 10.

The retention means 16 and the module 40 comprise complementary parts of a two-part retention mechanism. For example, the retention means 16 may comprise an elongate slide protrusion which is configured to be slidably received within a receptacle on the module 40, thereby allowing the module 40 to be installed by sliding. The retention means 16 may additionally or alternatively comprise a clip mechanism whereby a clip portion on the module 40 can be inserted into a suitably configured receptacle of the retention means 16 (such as a Universal Serial Bus (USB) port). The retention means 16 may additionally or alternatively comprise a magnetic mechanism whereby the retention means 16 and the module 40 are provided with mutually attractive magnetic portions (such as magnetic strips).

The container 10 may further comprise a release means to cause the retention means to release a retained module and/or to allow access to the contents of the retained module. For example, a button 26 may be provided which is mechanically connected to the retention means. The release means may alternatively be a grip portion which allows the user to exert a sufficient pulling force on the module 40 such that the retention means 16 releases the module 40.

The module 40 may be configured to be "tamper-proof", such that the release means causes an indicator on the module (such as a frangible seal) to irreversibly show that a user has accessed the module (for example, by destroying the seal).

The release means may be configured to be "child-proof", such that a child is substantially unable to release the module or access the contents of the module. For example, the release means may require a button to be pressed with a level of force that the average child is unable to provide.

The release means may be operatively connected to an identification means for identifying a user. The identification means could be configured as a fingerprint recognition mechanism 28 to recognise the fingerprint of a user and compare it to a set of allowed users. It could additionally or alternatively include a reader (such as an Radio Frequency Identification (RFID) reader) to recognise a data medium (such as an RFID chip) and/or an input means for receiving a passcode, a personal identification number (PIN) or the like. Based on the identification, the identification means may then allow access to the content of a module and/or the connection or removal of one or more modules. The identification means may also be configured to activate the aerosol generating device (or at least allow the aerosol generating device to be activated).

The body 12 is provided with at least one recess 18. Typically a recess 18 is provided as a cut-out of a corner portion of the body 12, such that the recess 18 has a top wall, one side wall, one open side, and an open bottom. The retention means 16 is provided along one or both walls of the recess 18.

The recess 18 and the module 40 are typically configured such that, when the module 40 is retained by the retention means 16, the container-module assembly has a substantially continuous surface across the outer faces of the body 12 and the module 40.

The body 12 can further comprise a second portion 20 configured to receive one or more articles. Generally the articles will be associated with the aerosol generating device. Where the aerosol generating device comprises a permanent part and one or more replaceable parts, the second portion 20 may be configured to receive one or more additional replaceable parts. For example, where the aerosol makes use of cartridges containing an aerosolisable liquid, the section portion 20 may be configured to store an additional cartridge.

The second portion 20 takes the form of a chamber in the body. The chamber has an open end into which the articles can be inserted, and a closed end against which the articles can rest. The chamber of the second portion 20 may be separate from that of the first portion 14. Similarly, it may be of a substantially different size and configuration.

In some embodiments, the container 10 is provided with a reader which is configured to receive data from a data medium provided on a module 40. The data may be transferred via a physical port, e.g. a USB port or in a wireless manner using Bluetooth, WiFi, near-field communication or any suitable secure or non-secure protocol. In addition, in some cases the reader may also be configured to send data back to the data medium, thereby causing allowing the data on the data medium to be updated.

The reader may operate continuously, or may only be active when a module is first inserted into the container 10. In this manner, the reader may be operatively connected to the retention means 16. The reader may be coupled with one or more processors. Based on the data received from the data medium, the processors are configured to perform one or more procedures.

In some embodiments, the container 10 is configured to record data relating to the state of the aerosol generating device and any articles stored in the container 10, and/or internal and external conditions (such as temperature). For example, the container 10 may record the amount of aerosolisable liquid available for use with the aerosol generating device and the current charge held by the battery of the aerosol generating device. Based on this data, a request to a recipient (such as an application running on the user's mobile device or computer) can be sent requesting that a particular type of module be connected (such as one having additional cartridges, or one to recharge the aerosol generating device).

This stored data can be used to validate a module that is connected based on the data received from the module. For example, if the container 10 calculates that additional cartridges are needed, the container 10 may issue an alert (such as by sending a message to the recipient) if a battery module is connected, since this would not remedy the low aerosolisable liquid state.

Additionally or alternatively, the processor may update a display on the body 12 to show the stored data.

Exemplary Embodiments

Three examples of containers according to the present invention are shown in respectively FIGS. 1 to 4, FIG. 5 and FIG. 6.

Turning first to the embodiment shown in FIGS. 1 to 4, a first embodiment of the container having an L-shape configuration is shown.

The container 10 has a body 12 which comprises a first portion 14 for receiving an aerosol generating device 30 (such as an electronic cigarette) and a second portion 20 for receiving one or more additional articles. In this case, the articles comprise two cartridges in a cartridge holder. Each of the cartridges contains a liquid which can be used in the aerosol generating device to generate an aerosol. Once both cartridges are used, the cartridge holder can be reused or disposed of.

The first portion 14 is formed as a chamber having a first length and a first width, and the second portion 20 is formed as a chamber having a second length and a second width. The chambers are parallel to one another, however the length of the chambers is not equal (that is, the first length is different from the second length). Typically the length of the second chamber is smaller, since a replacement part for the aerosol generating device will take up less volume than the aerosol generating device itself.

The body 12 is additionally provided with a single recess 18 which is formed as a cut-out of a corner of the body 12. A retention means 16 (in the form of one part of a slide mechanism) is provided along a wall of the recess 18.

The recess 18 is located below the second portion 20. This causes the body 12 to have a substantially L-shape when a module is not retained by the retention means 16.

The recess 18 has a third length and a third width. The third width is substantially equal to the second width (that is, the width of the recess 18 is about the width of the second portion 20). The third length is substantially equal to the different between the first length and the second length. In other words, the length of the recess 18 plus the length of the second portion 20 is about equal to the length of the first portion 14.

Figure 1:
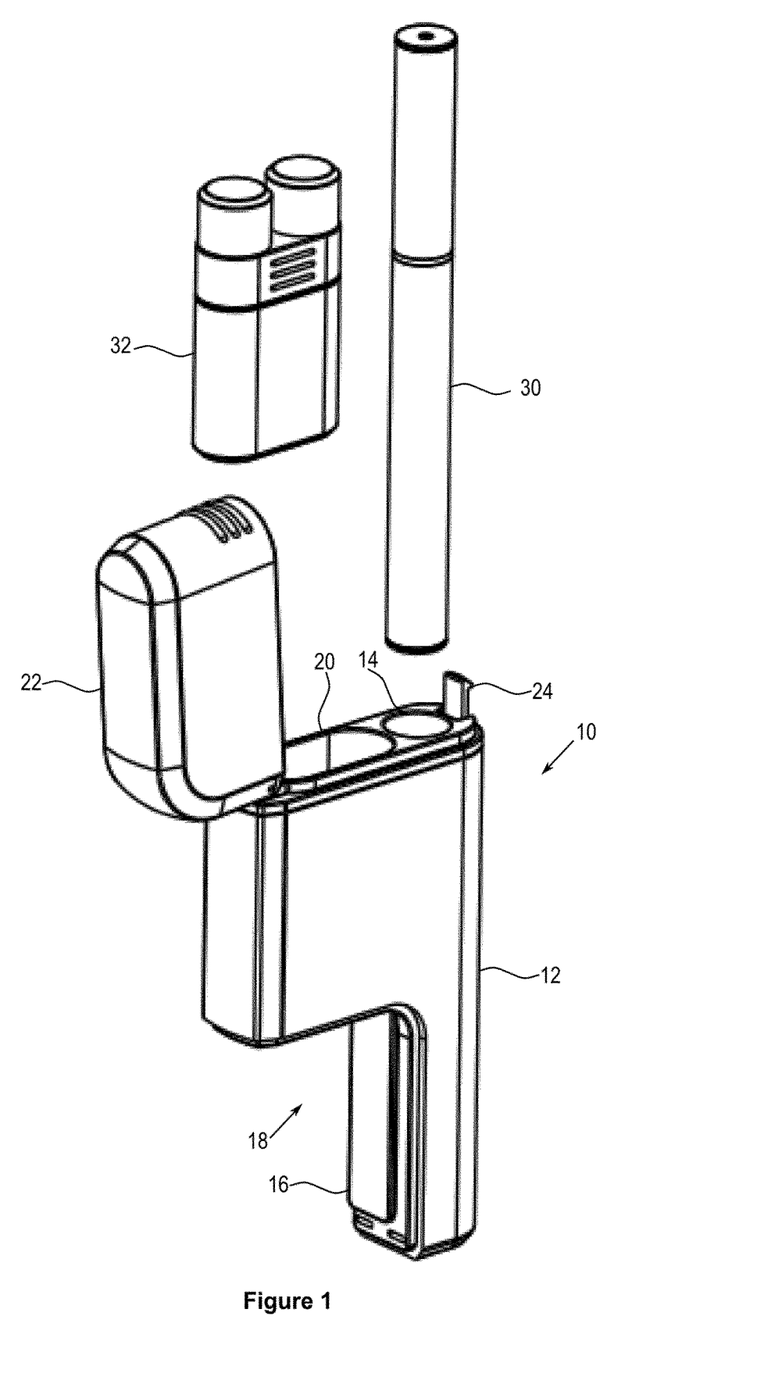
Figure 2:
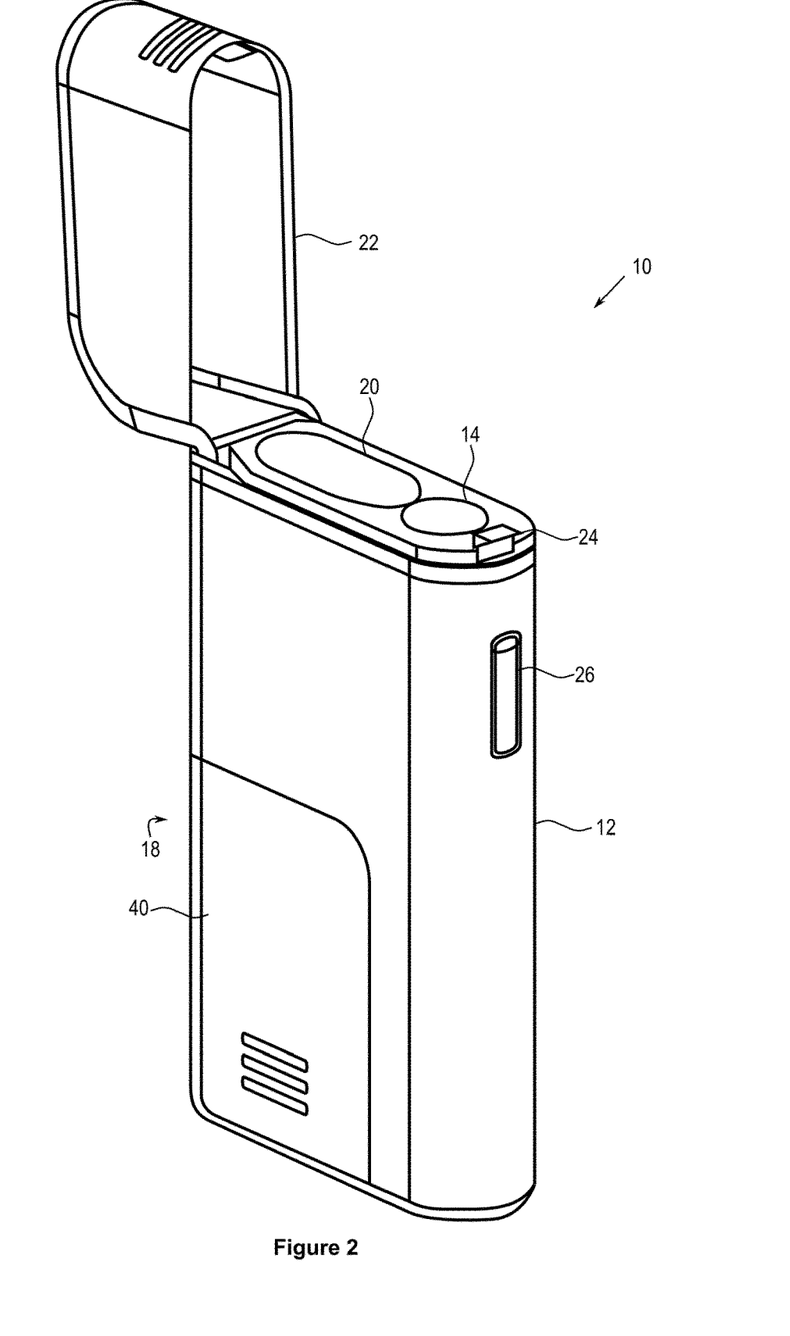
Figure 3:
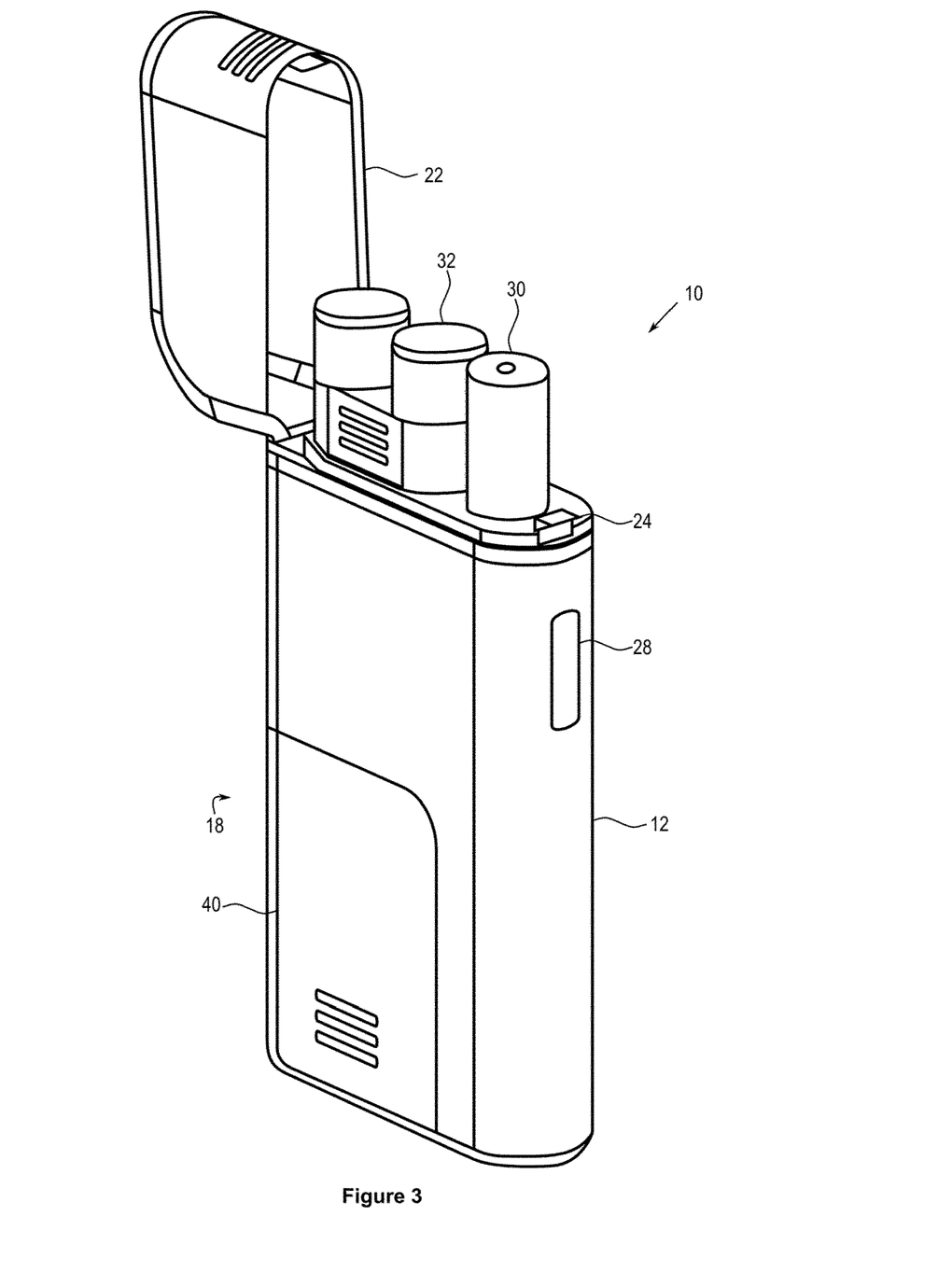
Figure 4:
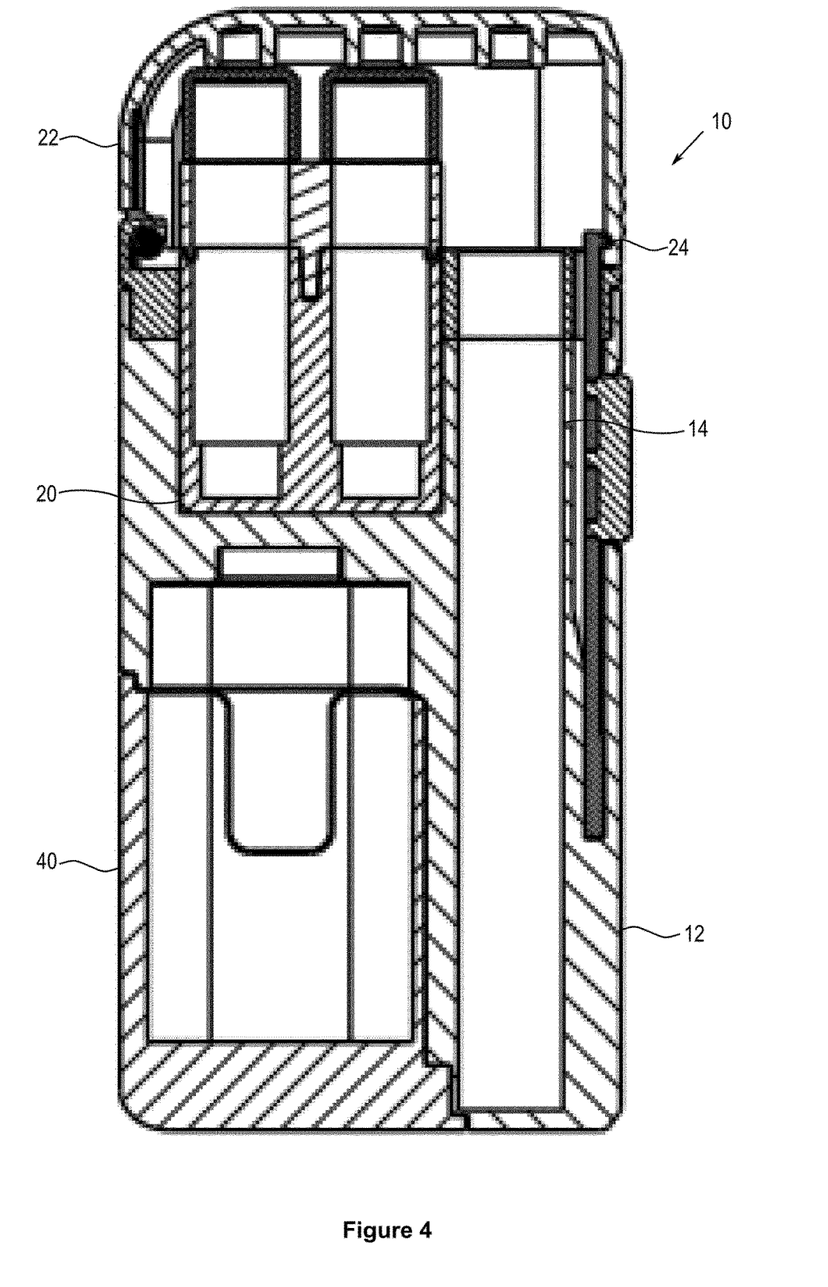
Figure 5:
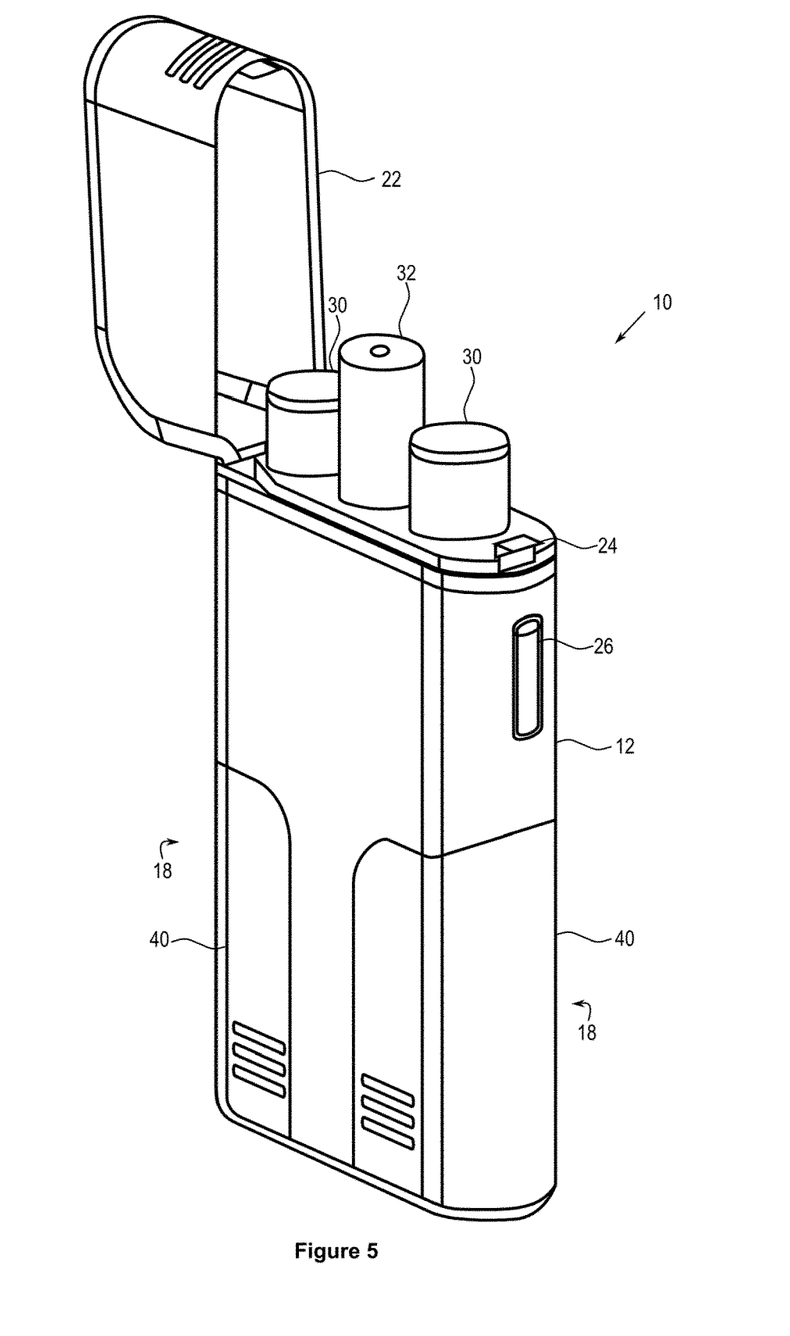

FIG. 5 shows a second embodiment of the container which has a substantially T-shape configuration.

The container 10 has a body 12 which comprises a first portion 14 for receiving an aerosol generating device 30 (such as an electronic cigarette) and a second portion 20 for receiving one or more additional articles.

The first portion 14 is formed as a first chamber having a first length and a first width. The second portion 20 comprises a second chamber having a second length and a second width and a third chamber having a third length and a third width. The second length and the third length are both smaller than the first length. In addition, the second chamber and the third chamber are located on opposite sides of the first chamber.

Below the second chamber and the third chamber, a first recess and a second recess are respectively provided. Each of the first recess and the second recess is provided with a respective retention means 16 along a respective wall of the recess. Each retention means may be of a different type to the others.

The first recess has a fourth length and a fourth width, where the fourth width is substantially equal to the second width, and the fourth length is substantially equal to the difference between the first length and the second length. The second recess has a fifth length and a fifth width, where the fifth width is substantially equal to the third width, and the fifth length is substantially equal to the difference between the first length and the third length.

Typically the second length is equal to the third length and the second width is equal to the third length. This causes the body 12 to have a substantially symmetrical T-shape when modules are not retained by the retention means 16.

Figure 6:
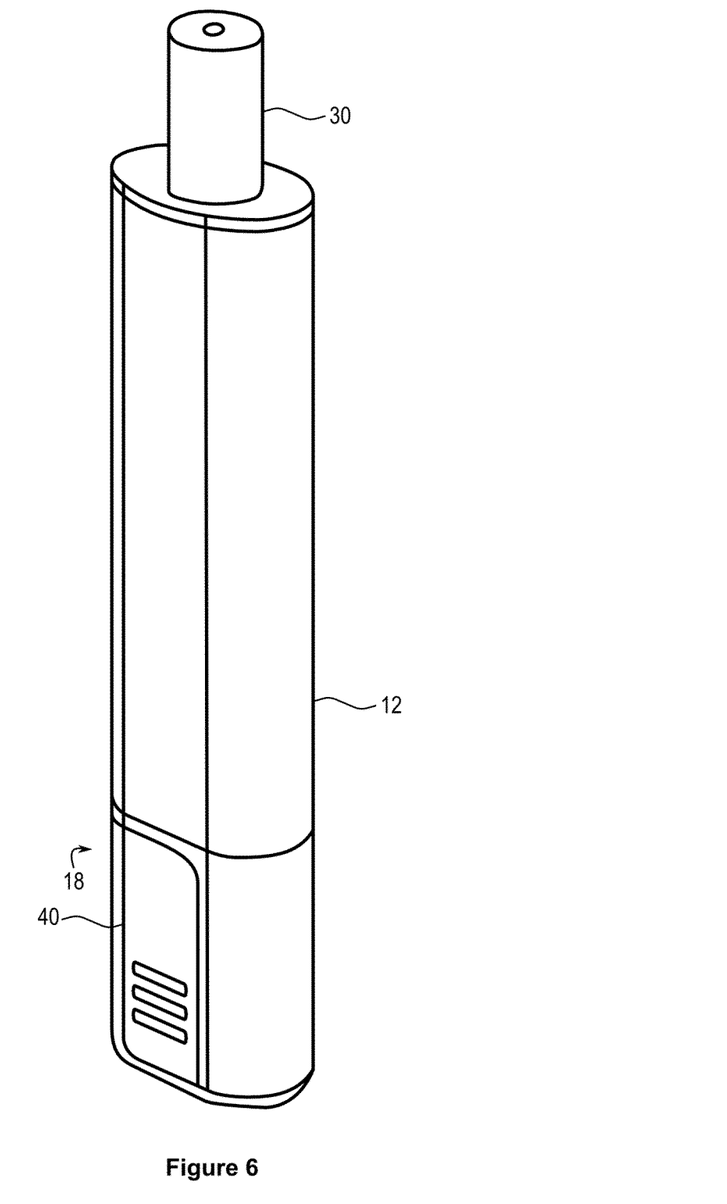

FIG. 6 shows a third embodiment of the container, having an I-shaped configuration.

The container 10 comprises an elongate body 12. At a first end of the body 12, the first portion 14 is provided in the form of a chamber in the body. At a lower end of the body 12, proximate the closed end of the chamber, an externally accessible retention means 16 is provided which is configured to releasably retain a module.

A recess 18 is formed at a second end of the body. The recess 18 is defined by a top face proximate the closed end of the chamber, and a side face formed by a thin extension of the body 12. The retention means 16 is located in the recess 18. The preferred embodiment shows the retention means 16 on the side face of the recess 18.

The recess 18 and module 40 are typically configured such that, when the module 40 is installed, the container-module assembly has a substantially I-shape.

The Cap

FIGS. 1 to 5 all show embodiments of the present invention where the container 10 is provided with a cap 22 which is configured to cover an end of the body 12. Such a cap can be incorporated into any container of the present invention, or may be omitted. The cap 22 is typically hingedly connected to the body 12 and, in use, can move between an open position and a closed position. In the open position, the aerosol generating device 30 (and any articles 32) can be accessed by the user. In the closed position, no access is possible.

The cap is generally shaped to have substantially the same cross-sectional shape as an upper part of the body 12. This means that, in the closed position, the container 10 has a substantially continuous surface across the outer faces of the body 12 and the cap 22.

The cap 22 may be hollow, such that, in the closed position, a portion of the aerosol generating device 30 (and any articles 32) are located, at least in part, inside the cap 22.

The body 12 may be provided with a cap locking mechanism 24 which can cooperate with a complementary cap locking mechanism on the cap 22. These can hold the cap 22 in its closed position until a predetermined amount of force is exerted. For example, the cap locking mechanism 24 may comprise a clip located on the body 12 and a complementary receptacle located on the cap 22, which holds the cap 22 in its closed position until force is exerted on the front face of the cap 22 or the body 12. Alternatively, a cap release mechanism (such as a button) may be provided to cause the cap locking mechanism 24 to be released.

Modules

Figure 7A:
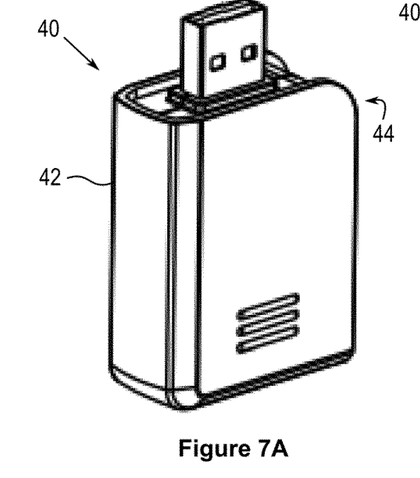
Figure 7B:
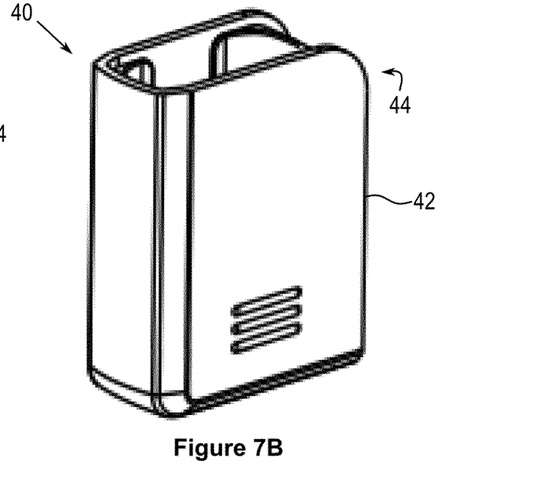
Figure 7C:
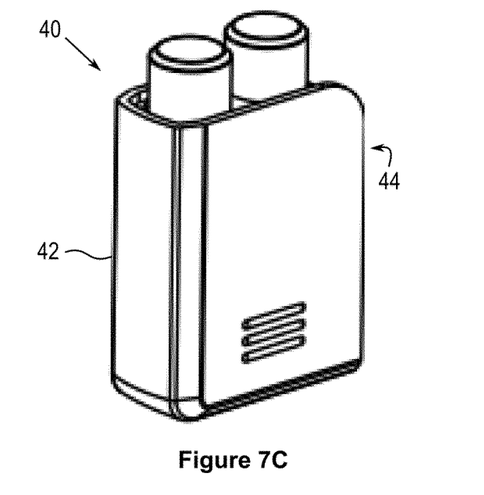

FIG. 7A to 7C show examples of modules which can be used with containers of the present invention.

In general, each module 40 comprises a body 42 which is adapted to hold contents. The contents may be permanently attached to the body 42 (and therefore permanently associated with the module 40), or may be removable (thereby making the module 40 a container). Each body 42 is provided with a retention means 44 which is complementary with the retention means 16. The retention means 44 is configured such that the module 40 may be releasably retained by the retention means 16.

In some embodiments, the module can include one of more readable media which are adapted to hold data. For example, a module 40 may be provided with an RFID tag. In use, this data can be retrieved from the media by a reader associated with the container. The data may comprise identification data relating to the content of the module. For example, the data may indicate the nature or the quantity of articles stored within.

Each module may have connection means (not shown) which are configured to connect to another module, such that a plurality of modules can be chained together. The connection means may be substantially similar to the retention means 16 of the container 10.

FIG. 7A shows a module 40 which is configured to function as a charger. The module comprises at least one connector (such as a male USB connector) electrically connected to a battery located within the body 42 and a receptacle for receiving the battery. In a charging mode, the module 40 is connected to a power source (such as a computer) by means of a complementary connector (such as a female USB connector). This charges the battery which has been received within the body 42. In a discharging mode, when the module 40 is connected to the body 12 of the container 10, the battery within the body 42 of the module 40 is configured to discharge energy to the battery of the aerosol generating device. In this manner, the module 40 allows for the aerosol generating device 30 to be recharged.

FIG. 7B shows a module 40 which is configured to hold one or more articles for use with the aerosol generating device (such as replaceable parts for the aerosol generating device). For example, as shown in FIG. 7C, this may be one or more cartridges containing an aerosolisable liquid for insertion into the aerosol generating device. The articles held in the module may be identical to the articles held in the second portion.

In use, the user may cause the module 40 to be released (at least in part) from the retention means. The user is then provided access to the one or more articles held by the module 40. The empty or partly empty module 40 may then be re-installed on the body 12, or may be discarded, depending on user preferences.

As described, the present invention provides a container for an aerosol generating device which can be simply configured for storing additional articles related to the device.

The invention claimed is:

1. A container for an aerosol generating device, the container comprising:
a body having a first portion configured to receive the aerosol generating device, one or more recesses forming a cut-out of a corner of the body, and one or more elongate protrusions externally accessible from the body, each elongate protrusion being positioned on a wall of the body in one of the one or more recesses and configured to releasably retain a module.

2. The container of claim 1, wherein each elongated protrusion is selected from the group consisting of:
a slide mechanism;
a clip mechanism; and
a magnet.

3. The container of claim 1, further comprising:
a cap configured to cover an end of the body.

4. The container of claim 1, wherein:
the first portion comprises a first chamber in the body; and
the body further comprises a second portion configured to receive one or more articles, the second portion comprising a second chamber in the body and a third chamber in the body;

the second chamber being located on a first side of the first chamber and the third chamber being located on a second side of the first chamber opposite to the first side, such that the body has a substantially T-shape.

5. The container of claim 1, wherein the aerosol generating device is an electronic cigarette, such that the first portion is configured to retain the electronic cigarette.

6. The container of claim 1, wherein each elongate protrusion is a slide mechanism.

7. A kit comprising:
the container of claim 1; and
a module configured to be releasably retained by at least one of the one or more elongate protrusions of the body.

8. The kit of claim 7, wherein the module comprises one or more of the group consisting of:
one or more replaceable parts for the aerosol generating device;
a battery; and
a charging device.

9. The kit of claim 8, wherein the container further comprises one or more readers configured to receive data from the module.

10. The kit of claim 8, wherein:
the first portion comprises a first chamber in the body; and
the body further comprises a second portion configured to receive one or more articles, the second portion comprising a second chamber in the body and a third chamber in the body;
the second chamber being located on a first side of the first chamber and the third chamber being located on a second side of the first chamber opposite to the first side, such that the body has a substantially T-shape.

11. The kit of claim 7, wherein the container further comprises one or more readers configured to receive data from the module.

12. The kit of claim 11, further comprising a processor configured to perform one or more procedures based on the received data.

13. The kit of claim 12, wherein the processor is configured to monitor state data, the state data comprising a condition of the state of one or more of: the container, the aerosol generating device, the module and articles stored within the module.

14. The kit of claim 12, wherein the processor is configured to send a message to a recipient based on the state data and/or the received data.

15. The kit of claim 7, wherein the elongate protrusion is a slide mechanism and the module has a receptacle for slidably receiving the elongate protrusion.

* * * * *